(12) United States Patent
Takeshima et al.

(10) Patent No.: US 8,932,555 B2
(45) Date of Patent: Jan. 13, 2015

(54) CATALYST FOR DECOMPOSITION OF SULFUR TRIOXIDE AND HYDROGEN PRODUCTION PROCESS

(75) Inventors: Shinichi Takeshima, Numazu (JP); Masato Machida, Kumamoto (JP)

(73) Assignees: Toyota Jidosha Kabushiki Kaisha, Toyota (JP); National University Corporation Kumamoto University, Kumamoto-shi (JP)

(*) Notice: Subject to any disclaimer, the term of this patent is extended or adjusted under 35 U.S.C. 154(b) by 0 days.

(21) Appl. No.: 14/118,386

(22) PCT Filed: May 18, 2012

(86) PCT No.: PCT/JP2012/063401
§ 371 (c)(1),
(2), (4) Date: Nov. 18, 2013

(87) PCT Pub. No.: WO2012/161290
PCT Pub. Date: Nov. 29, 2012

(65) Prior Publication Data
US 2014/0086823 A1    Mar. 27, 2014

(30) Foreign Application Priority Data

May 25, 2011    (JP) .................................. 2011-117116

(51) Int. Cl.
*C01B 3/00*    (2006.01)
*C01B 17/50*    (2006.01)
(Continued)

(52) U.S. Cl.
CPC ............... *C01B 3/068* (2013.01); *B01J 23/002* (2013.01); *B01J 23/30* (2013.01); *B01J 35/1061* (2013.01);
(Continued)

(58) Field of Classification Search
USPC ..................... 423/539, 579, 648.1, 657, 658.2
See application file for complete search history.

(56) References Cited

U.S. PATENT DOCUMENTS 3,970,745 A *   7/1976   Takeuchi ...................... 423/657
4,330,523 A    5/1982   Brecher et al.
(Continued)

FOREIGN PATENT DOCUMENTS

CN    101855013 A    10/2010
EP    0 775 519 A1    5/1997
(Continued)

OTHER PUBLICATIONS

Aug. 1, 2012 International Search Report issued in International Application No. PCT/JP2012/063401.
(Continued)

*Primary Examiner* — Timothy Vanoy
(74) *Attorney, Agent, or Firm* — Oliff PLC (57) ABSTRACT

A sulfur trioxide decomposition catalyst, in particular, a sulfur trioxide decomposition catalyst capable of lowering the temperature required when producing hydrogen by an S—I cycle process is disclosed. A sulfur trioxide decomposition catalyst that includes a composite oxide of tungsten, vanadium and at least one metal selected from the group consisting of transition metal and rare earth elements is provided. Also, a sulfur dioxide production process that includes decomposing sulfur trioxide into sulfur dioxide and oxygen by using the sulfur trioxide decomposition catalyst above is provided. Furthermore, a hydrogen production process, wherein the reaction of decomposing sulfur trioxide into sulfur dioxide and oxygen by an S—I cycle process is performed by the above-described sulfur dioxide production process is provided.

12 Claims, 4 Drawing Sheets

(51) Int. Cl.
*C01B 3/06* (2006.01)
*B01J 23/00* (2006.01)
*B01J 23/30* (2006.01)
*B01J 35/10* (2006.01)
*B01J 37/02* (2006.01)
*B01J 37/08* (2006.01)
*C01B 3/04* (2006.01)
*C01B 13/02* (2006.01)
*B01J 23/888* (2006.01)
*B01J 37/00* (2006.01)
*B01J 37/03* (2006.01)
*B01J 21/08* (2006.01)

(52) U.S. Cl.
CPC ............ *B01J 35/109* (2013.01); *B01J 37/0205* (2013.01); *B01J 37/088* (2013.01); *C01B 3/042* (2013.01); *C01B 13/0203* (2013.01); *C01B 13/0207* (2013.01); *C01B 17/502* (2013.01); *B01J 37/024* (2013.01); *B01J 23/888* (2013.01); *B01J 35/1057* (2013.01); *B01J 37/0018* (2013.01); *B01J 37/0201* (2013.01); *Y02E 60/364* (2013.01); *B01J 37/033* (2013.01); *B01J 21/08* (2013.01); *B01J 2523/00* (2013.01)
USPC ........ 423/539; 423/579; 423/648.1; 423/657; 423/658.2

(56) References Cited

U.S. PATENT DOCUMENTS

| | | | |
|---|---|---|---|
| 5,283,041 | A | 2/1994 | Nguyen et al. |
| 2002/0025905 | A1 | 2/2002 | Harris et al. |
| 2002/0153282 | A1 | 10/2002 | Cheng et al. |
| 2004/0166056 | A1 | 8/2004 | Eyman et al. |
| 2005/0000825 | A1 | 1/2005 | Nomura et al. |
| 2009/0191101 | A1 | 7/2009 | Elam et al. |
| 2009/0286677 | A1 | 11/2009 | Takeshima et al. |
| 2011/0139684 | A1 | 6/2011 | Gao et al. |

FOREIGN PATENT DOCUMENTS

| | | |
|---|---|---|
| EP | 0 850 676 A1 | 7/1998 |
| EP | 1 153 648 A1 | 11/2001 |
| EP | 1 192 990 A2 | 4/2002 |
| EP | 1 340 539 A1 | 9/2003 |
| EP | 2 100 665 A1 | 9/2009 |
| JP | A-52-107296 | 9/1977 |
| JP | A-2005-041764 | 2/2005 |
| JP | A-2007-218604 | 8/2007 |
| JP | A-2008-12382 | 1/2008 |
| JP | A-2012-148268 | 8/2012 |
| WO | WO 90/12646 | 11/1990 |
| WO | WO 2005/046864 A1 | 5/2005 |
| WO | WO 2007/108939 A2 | 9/2007 |
| WO | WO 2010/121280 A1 | 10/2010 |
| WO | WO 2011/053953 A2 | 5/2011 |

OTHER PUBLICATIONS

May 2, 2012 International Search Report issued in International Application No. PCT/JP2011/080587.
Aug. 29, 2013 Office Action issued in U.S. Appl. No. 13/997,473.
A. Giaconia, et al., "Hydrogen/methanol production by sulfur-iodine thermochemical cycle powered by combined solar/fossil energy," International Journal of Hydrogen Energy 32 (2007), 469-481.
H. Tagawa, et al., "Catalytic Decomposition of Sulfuric Acid Using Metal Oxides as the Oxygen Generating Reaction in Thermochemical Water Splitting Process," International Journal of Hydrogen Energy, vol. 14, No. 1, pp. 11-17, 1989.
K.T. Li, et al., "Selective Oxidation of Hydrogen Sulfide on Rare Earth Orthovanadates and Magnesium Vanadates," Applied Catalysis A: General 206, (2001), 197-203.
Takeshima et al., U.S. Appl. No. 13/997,473, filed Jun. 24, 2013.
Jun. 19, 2014 Office Action issued in U.S. Appl. No. 13/997,473.
Machida et al., "Efficient catalytic decomposition of sulfuric acid with copper vanadates as an oxygen-generating reaction for solar thermochemical water splitting cycles," Chemical Communications 2011, vol. 47, pp. 9591-9593.

* cited by examiner

CATALYST FOR DECOMPOSITION OF SULFUR TRIOXIDE AND HYDROGEN PRODUCTION PROCESS

TECHNICAL FIELD

The present invention relates to a catalyst for decomposition of sulfur trioxide ($SO_3$). The present invention also relates to a hydrogen production process including a step of decomposing sulfur trioxide by using the catalyst for decomposition of sulfur trioxide.

BACKGROUND ART

In recent years, due to global warming, hydrogen is attracting attention as clean energy since carbon dioxide is not formed during combustion.

In general, for the production of hydrogen, steam reforming of a hydrocarbon fuel, represented by the following formulae (A1) and (A2), is employed:

$$C_nH_m + nH_2O \rightarrow nCO + (n+m/2)H_2 \quad (A1)$$

$$CO + H_2O \rightarrow CO_2 + H_2 \quad (A2)$$

$$C_mH_m + 2nH_2O \rightarrow nCO_2 + (2n+m/2)H_2 \quad \text{Total reaction}$$

Accordingly, although carbon dioxide is not formed by the combustion of hydrogen, carbon dioxide is generally formed in the production of hydrogen.

In this connection, use of solar thermal energy or nuclear thermal energy has been proposed as the method for producing hydrogen without using a hydrocarbon fuel (see, Patent Document 1 and Non-Patent Document 1).

As the method for producing hydrogen from water by utilizing thermal energy, there has been proposed a method referred to as an S—I (sulfur-iodine) cycle process represented by the following formulae (B1) to (B3):

$$H_2SO_4 \text{ (liquid)} \rightarrow H_2O \text{ (gas)} + SO_2 \text{ (gas)} + 1/2 O_2 \text{ (gas)} \quad (B1)$$

(reaction temperature=about 950° C., $\Delta H$=188.8 kJ/mol-$H_2$)

$$I_2 \text{ (liquid)} + SO_2 \text{ (gas)} + 2H_2O \text{ (liquid)} \rightarrow 2HI \text{ (liquid)} + H_2SO_4 \text{ (liquid)} \quad (B2)$$

(reaction temperature=about 130° C., $\Delta H$=−31.8 kJ/mol-$H_2$)

$$2HI \text{ (liquid)} \rightarrow H_2 \text{ (gas)} + I_2 \text{ (gas)} \quad (B3)$$

(reaction temperature=about 400° C., $\Delta H$=146.3 kJ/mol-$H_2$)

The total reaction of the S—I (sulfur-iodine) cycle process represented by formulae (B1) to (B3) is as follows:

$$H_2O \rightarrow H_2 + 1/2 O_2$$

($\Delta H$=286.5 kJ/mol-$H_2$ (on higher heating value basis))
($\Delta H$=241.5 kJ/mol-$H_2$ (on lower heating value basis))

Here, the reaction of formula (B1) can be divided into two elementary reactions of the following formulae (B1-1) and (B1-2):

$$H_2SO_4 \text{ (liquid)} \rightarrow H_2O \text{ (gas)} + SO_3 \text{ (gas)} \quad (B1-1)$$

(reaction temperature=about 300° C., $\Delta H$=90.9 kJ/mol-$H_2$)

$$SO_3 \text{ (gas)} \rightarrow SO_2 \text{ (gas)} + 1/2 O_2 \text{ (gas)} \quad (B1-2)$$

(reaction temperature=about 950° C., $\Delta H$=97.9 kJ/mol-$H_2$)

That is, in the case of producing hydrogen by an S—I cycle process, the sulfur trioxide ($SO_3$) decomposition reaction of formula (B1-2) requires a highest temperature, and the high temperature required in this reaction cannot be easily obtained.

With respect to such a problem, in Non-Patent Document 1, natural gas is burned, if desired, while using solar thermal energy as the heat source, whereby additional thermal energy is obtained.

Also, in order to lower the temperature required in the sulfur trioxide decomposition reaction of formula (B1-2), use of a platinum catalyst has been proposed. However, it is known that when a platinum catalyst is used in this reaction, the catalyst may have high performance at the start of use but the platinum is oxidized with oxygen produced in the reaction and due to coarsening of the platinum particle, the catalytic activity is reduced. Furthermore, the platinum catalyst is expensive and its use on an industrial scale is difficult.

In this connection, Non-Patent Document 2 has proposed a technique where in order to lower the temperature required in the sulfur trioxide decomposition reaction, a catalyst selected from the group consisting of platinum (Pt), chromium (Cr), iron (Fe) and oxides thereof is used by depositing it on an alumina support.

In addition, with respect to the S—I cycle process, Patent Document 2 has proposed a technique where in the reaction represented by formula (B2), i.e., in the reaction of obtaining hydrogen iodide and sulfuric acid from iodine, sulfur dioxide and water, the reaction of sulfur dioxide with water is performed on the cathode side of a cation-exchange membrane, and the reaction of iodine is performed on the anode side of the cation-exchange membrane, whereby the subsequent separation operation is omitted.

Incidentally, other than the S—I cycle process, a Westinghouse cycle process, an Ispra-Mark 13 cycle process and the like are known as the method for producing hydrogen by utilizing thermal energy, however, also in these processes, sulfur trioxide must be decomposed into sulfur dioxide and hydrogen as in formula (B1-2).

RELATED ART

Patent Document

[Patent Document 1] Kokai (Japanese Unexamined Patent Publication) No. 2007-218604
[Patent Document 2] Kokai No. 2005-041764

Non-Patent Document

[Non-Patent Document 1] A. Giaconia, et al., International Journal of Hydrogen Energy, 32, 469-481 (2007)
[Non-Patent Document 2] H. Tagawa, et al., International Journal of Hydrogen Energy, 14, 11-17 (1989)

SUMMARY OF THE INVENTION

Problems to be Solved by the Invention

The present invention provides a sulfur trioxide decomposition catalyst, particularly, a sulfur trioxide decomposition catalyst capable of lowering the temperature required when producing hydrogen from water.

Means to Solve the Problems

As a result of intensive studies, the present inventors have accomplished the present invention described below.

<1> A sulfur trioxide decomposition catalyst comprising a composite oxide of vanadium, tungsten and at least one metal selected from the group consisting of transition metal and rare earth elements.

<2> The catalyst as described in <1> above, wherein the at least one metal is selected from the group consisting of copper (Cu), chromium (Cr), titanium (Ti), zirconium (Zr), lanthanum (La), cerium (Ce), neodymium (Nd) and a combination thereof.

<3> The catalyst as described in <1> or <2> above, wherein in the composite oxide, the atom ratio between the at least one metal and vanadium is from 1:0.1 to 1:10.

<4> The catalyst as described in any one of <1> to <3> above, wherein in the composite oxide, the atom ratio between the at least one metal and tungsten is from 1:0.01 to 1:1.

<5> The catalyst as described in any one of <1> to <4> above, wherein the composite oxide is supported on a support.

<6> The catalyst as described in <5> above, wherein the support is selected from the group consisting of silica, alumina, zirconia, titania and a combination thereof.

<7> The catalyst as described in <6> above, wherein the support is a porous silica support having a pore structure.

<8> The catalyst as described in <7> above, wherein the composite oxide is supported inside the pore structure of the porous silica support, and in the pore distribution of the porous silica support, the peak attributable to a gap between primary particles of silica is present in the range of a pore size of 5 to 50 nm and the peak attributable to the pore structure inside the silica particle is present in the range of a pore size of 1 to 5 nm.

<9> A process for producing the catalyst described in any one of <5> to <8> above, comprising:

causing the support to absorb one aqueous solution out of an aqueous solution containing a salt of a transition metal element or rare earth element, an aqueous solution of a vanadium salt and an aqueous solution of a tungsten salt, then drying and calcining the support, causing the support to absorb another aqueous solution out of an aqueous solution of a salt of a transition metal element or rare earth element, an aqueous solution of a vanadium salt and an aqueous solution of a tungsten salt, then drying and calcining the support, causing the support to absorb a further aqueous solution out of an aqueous solution of a salt of a transition metal element or rare earth element, an aqueous solution of a vanadium salt and an aqueous solution of a tungsten salt, then drying and calcining the support, and firing the obtained support.

<10> A sulfur dioxide production process comprising decomposing sulfur trioxide into sulfur dioxide and oxygen by using the sulfur trioxide decomposition catalyst described in any one of <1> to <8> above.

<11> The process as described in <10> above, wherein the decomposition is performed at a temperature of 600° C. or more.

<12> The process as described in <10> or <11> above, wherein the decomposition is performed at a temperature of 800° C. or less.

<13> A hydrogen production process comprising splitting water into hydrogen and oxygen, wherein the process comprises decomposing sulfuric acid into water, sulfur dioxide and oxygen through a reaction represented by the following formula (X1) and out of the elementary reactions represented by the following formulae (X1-1) and (X1-2) which are an elementary reaction of the reaction represented by the following formula (X1), the elementary reaction of formula (X1-2) is performed by the process described in any one of <10> to <12> above:

$$H_2SO_4 \rightarrow H_2O + SO_2 + 1/2 O_2 \quad (X1)$$

$$H_2SO_4 \rightarrow H_2O + SO_3 \quad (X1\text{-}1)$$

$$SO_3 \rightarrow SO_2 + 1/2 O_2 \quad (X1\text{-}2)$$

<14> The hydrogen production process as described in <13> above, which is an S—I cycle process, a Westinghouse cycle process, or an Ispra-Mark 13 cycle process.

Effects of the Invention

According to the sulfur trioxide decomposition catalyst of the present invention, the temperature required for the sulfur trioxide decomposition reaction can be lowered. Also, according to the sulfur dioxide production process of the present invention, sulfur trioxide can be decomposed at a relatively low temperature to obtain sulfur dioxide. Furthermore, according to the hydrogen production process of the present invention, water can be split at a relatively low temperature to obtain hydrogen.

SULFUR TRIOXIDE DECOMPOSITION CATALYST

The sulfur trioxide decomposition catalyst of the present invention contains a composite oxide of tungsten, vanadium and at least one metal selected from the group consisting of transition metal and rare earth elements.

According to the sulfur trioxide decomposition catalyst of the present invention, the temperature required for the sulfur trioxide decomposition reaction of formula (B1-2) can be lowered and, for example, at a temperature of about 650° C., the sulfur trioxide decomposition reaction can be made to proceed at a substantive rate.

Also, in accordance with the sulfur trioxide decomposition catalyst of the present invention, depending on the applied temperature, the sulfur trioxide decomposition reaction can be made to proceed at a more advantageous rate, comparing to a similar composite oxide to the present invention, except for not comprising tungsten, i.e., a composite oxide of vanadium and at least one metal selected from the group consisting of transition metal and rare earth elements. Although not being bound by theory, this is attributed to that adding tungsten makes the composite oxide to become comparatively acidic character, and accordingly the active cite of the composite oxide is prevented from oxygen adsorption thereto, and deactivation of the active cite due to the adsorption. However, since tungsten oxide itself does not substantially have catalytic activity to the sulfur trioxide decomposition reaction, if tungsten is added in too much amount, the activity as the sulfur trioxide decomposition catalyst may be lowered.

As described above, in the conventional process of decomposing sulfur trioxide, a temperature near 1,000° C. is generally employed. However, the material capable of withstanding such a high temperature is very limited and moreover, is fairly expensive.

Also, the high temperature close to 1,000° C. can be hardly obtained at a low cost from the solar energy. More specifically, for example, as the collector for obtaining solar thermal energy, a parabolic dish-type collector, a solar tower-type collector and a parabolic trough-type collector are known. Of these, in the parabolic trough-type collector enjoying a simple structure and a low cost and being suitable for a large-scale plant, collection of solar energy at a high temperature close to 1,000° C. is unrealistic in view of balance between collection of solar energy and dissipation of energy due to radiation.

Accordingly, it is of very great industrial value to lower the temperature required for the sulfur trioxide decomposition reaction by using the sulfur trioxide decomposition catalyst of the present invention and let the sulfur trioxide decomposition reaction proceed at a substantive rate, for example, at a temperature of about 650° C. or 700° C.

(Sulfur Trioxide Decomposition Catalyst—Composite Oxide)

As for the transition metal or rare earth element constituting the composite oxide of the sulfur trioxide decomposition catalyst of the present invention, an arbitrary transition metal or rare earth element, for example, a metal selected from the group consisting of copper (Cu), chromium (Cr), titanium (Ti), zirconium (Zr), lanthanum (La), cerium (Ce), neodymium (Nd) and a combination thereof, may be used.

In the composite oxide of the sulfur trioxide decomposition catalyst of the present invention, the atom ratio between vanadium and at least one metal selected from the group consisting of transition metal and rare earth elements (at least one metal such as transition metal:vanadium) may be from 1:0.1 to 1:10, from 1:0.5 to 1:5, from 1:1 to 1:5, or from 1:1 to 1:3.

Also, in the composite oxide of the sulfur trioxide decomposition catalyst of the present invention, the atom ratio between tungsten and at least one metal selected from the group consisting of transition metal and rare earth elements (at least one metal such as transition metal:tungsten) may be from 1:0.01 to 1:1, from 1:0.05 to 1:0.5, or from 1:0.1 to 1:0.3.

The composite oxide of the sulfur trioxide decomposition catalyst of the present invention can be obtained by an arbitrary method.

For example, the composite oxide may be obtained by mixing individual metal oxides constituting the composite oxide and firing the mixture. Also, in the case of selecting a salt of a transition metal element or the like, a vanadium salt and a tungsten salt to enable coprecipitation thereof, a precursor of the composite oxide is obtained by coprecipitation from an aqueous solution containing a salt of a transition metal element or the like, a vanadium salt and a tungsten salt, and the obtained coprecipitate is fired, whereby the composite oxide can be obtained.

Furthermore, when the sulfur trioxide decomposition catalyst of the present invention is a supported catalyst where the composite oxide is supported on a support, the support is caused to absorb an aqueous solution containing a salt of a transition metal element or rare earth element, dried and calcined, the support is then caused to absorb an aqueous solution of a vanadium salt, dried and calcined, the support is then caused to absorb an aqueous solution of a tungsten salt, dried and calcined, and thereafter, the obtained support is fired, whereby the sulfur trioxide decomposition catalyst of the present invention can be obtained. The order in which at least one transition metal, vanadium and tungsten are supported can be arbitrary selected. Therefore, for example, the support is caused to absorb an aqueous solution of a tungsten salt, dried and calcined, the support is then caused to absorb an aqueous solution of a vanadium salt, dried and calcined, the support is then caused to absorb an aqueous solution containing a salt of a transition metal element or the like, dried and calcined, and thereafter, the obtained support is fired, whereby the sulfur trioxide decomposition catalyst of the present invention can be obtained.

Also, in the case of selecting a tungsten salt, a vanadium salt and a salt of a transition metal element or the like to enable coprecipitation thereof, the support is caused to absorb an aqueous solution containing a tungsten salt, a vanadium salt and a salt of a transition metal element or the like, dried and calcined, and thereafter, the obtained support is fired, whereby the sulfur trioxide decomposition catalyst of the present invention can be obtained.

(Sulfur Trioxide Decomposition Catalyst—Support)

The composite oxide of the sulfur trioxide decomposition catalyst of the present invention may be supported on a support, whereby the surface area of the composite oxide can be increased and reduction in the surface area of the composite oxide during use can be suppressed. In this connection, the usable support includes a support selected from the group consisting of silica, alumina, zirconia, titania and a combination thereof.

Accordingly, for example, silica, particularly, a porous silica support having a pore structure, can be used as the support. In this case, the composite oxide is preferably supported inside the pore structure of the porous silica support. Also, in this case, the porous silica support preferably has a pore distribution such that the peak attributable to a gap between primary particles of silica is present in the range of a pore size of 5 to 50 nm, particularly a pore size of 5 to 30 nm, and the peak attributable to the pore structure inside the silica particle is present in the range of a pore size of 1 to 5 nm, particularly a pore size of 2 to 4 nm.

In the case of using a porous silica support having a pore structure in this way, the composite oxide is supported near the surface of the pore structure of the porous silica support, whereby sintering of the composite oxide particle can be suppressed. Although not being bound by theory, it is considered that in the composite oxide particle maintained in such a very fine state, not only the surface area of the catalyst increases about 100 times due to microparticulation of the catalyst but also the property of the catalyst surface is sometimes changed to improve the catalytic performance of the composite oxide.

Furthermore, it is considered that in the pore distribution of the porous silica particle having a pore structure, a two-dimensional distribution of pores is created and a vapor-phase gas having a high diffusion speed is supplied at a high speed from pores with a pore size of ten to several tens of nm to an active site having a wide surface area and a pore size of several nm, thereby increasing the chance of bringing the composite oxide particle into contact with sulfur trioxide, as a result, the catalytic performance is improved.

Incidentally, the porous silica support having a pore structure can be obtained by the method described in Kokai No. 2008-12382.

(Sulfur Dioxide Production Process)

The process of the present invention for producing sulfur dioxide includes decomposing sulfur trioxide into sulfur dioxide and oxygen by using the sulfur trioxide decomposition catalyst of the present invention. In this process, the sulfur trioxide decomposition catalyst of the present invention is used, whereby the decomposition can be performed at a lower temperature than in the conventional process of decomposing sulfur trioxide, for example, at a temperature of 800° C. or less, 750° C. or less, 700° C. or less, or 650° C. or less. Also, the process can be performed at a temperature of 600° C. or more, or 650° C. or more. Therefore, in this process, the sulfur trioxide decomposition catalyst of the present invention is used, whereby the sulfur trioxide decomposition reaction can proceed at unanticipated high speed, at a temperature of about 700° C., for example, at a temperature of from 600° C. to 800° C., or from 650° C. to 750° C.

(Hydrogen Production Process)

The process of the present invention for producing hydrogen includes splitting water into hydrogen and oxygen, for example, splitting water into hydrogen and oxygen by an S—I cycle process, a Westinghouse cycle process, or an Ispra-Mark 13 cycle process. Here, the process of the present invention includes decomposing sulfuric acid into water, sulfur dioxide and oxygen through a reaction represented by the following formula (X1) and out of the elementary reactions of formulae (X1-1) and (X1-2) which are an elementary reaction of the reaction represented by the following formula (X1), the elementary reaction of formula (X1-2) is performed by the process of the present invention for producing sulfur dioxide:

$$H_2SO_4 \rightarrow H_2O + SO_2 + 1/2 O_2 \quad (X1)$$

$$H_2SO_4 \rightarrow H_2O + SO_3 \quad (X1\text{-}1)$$

$$SO_3 \rightarrow SO_2 + 1/2 O_2 \quad (X1\text{-}2)$$

That is, for example, in the S—I (sulfur-iodine) cycle process represented by the following formulae (X1) to (X3), the process of the present invention for producing hydrogen includes, out of the elementary reactions of formulae (X1-1) and (X1-2) which are an elementary reaction of the reaction of formula (X1), performing the elementary reaction of formula (X1-2) by the process of the present invention for producing sulfur dioxide:

$$H_2SO_4 \rightarrow H_2O + SO_2 + 1/2 O_2 \quad (X1)$$

$$H_2SO_4 \rightarrow H_2O + SO_3 \quad (X1\text{-}1)$$

$$SO_3 \rightarrow SO_2 + 1/2 O_2 \quad (X1\text{-}2)$$

$$I_2 + SO_2 + 2H_2O \rightarrow 2HI + H_2SO_4 \quad (X2)$$

$$2HI \rightarrow H_2 + I_2 \quad (X3)$$

$$H_2O \rightarrow H_2 + 1/2 O_2 \quad \text{Total reaction}$$

Also, for example, in the Westinghouse cycle process represented by the following formulae (X1), (X4) and (X5), the process of the present invention for producing hydrogen includes, out of the elementary reactions of formulae (X1-1) and (X1-2) which are an elementary reaction of the reaction of formula (X1), performing the elementary reaction of formula (X1-2) by the process of the present invention for producing sulfur dioxide:

$$H_2SO_4 \rightarrow H_2O + SO_2 + 1/2 O_2 \quad (X1)$$

$$H_2SO_4 \rightarrow H_2O + SO_3 \quad (X1\text{-}1)$$

$$SO_3 \rightarrow SO_2 + 1/2 O_2 \quad (X1\text{-}2)$$

$$SO_2 + 2H_2O \rightarrow H_2SO_3 \quad (X4)$$

$$H_2SO_3 + H_2O + \rightarrow H_2 + H_2SO_4 \text{ (electrolysis)} \quad (X5)$$

$$H_2O \rightarrow H_2 + 1/2 O_2 \quad \text{Total reaction}$$

Furthermore, for example, in the Ispra-Mark 13 cycle process represented by the following formulae (X1), (X6) and (X7), the process of the present invention for producing hydrogen includes, out of the elementary reactions of formulae (X1-1) and (X1-2) which are an elementary reaction of the reaction of formula (X1), performing the elementary reaction of formula (X1-2) by the process of the present invention for producing sulfur dioxide:

$$H_2SO_4 \rightarrow H_2O + SO_2 + 1/2 O_2 \quad (X1)$$

$$H_2SO_4 \rightarrow H_2O + SO_3 \quad (X1\text{-}1)$$

$$SO_3 \rightarrow SO_2 + 1/2 O_2 \quad (X1\text{-}2)$$

$$2HBr \rightarrow Br_2 + H_2 \quad (X6)$$

$$Br_2 + SO_2 + 2H_2O + \rightarrow 2HBr + H_2SO_4 \quad (X7)$$

$$H_2O \rightarrow H_2 + 1/2 O_2 \quad \text{Total reaction}$$

EXAMPLES

Reference Example 1-7, Comparative Example 1-8, and Reference Example X

Reference Example 1-7, Comparative Example 1-8, and Reference Example X were performed as follows.

Reference Example 1

In this Reference Example, a composite metal oxide (Cu—V—O) of copper (Cu) and vanadium (V) was used as the catalyst.

(Production of Unsupported Catalyst)

Figure 1:
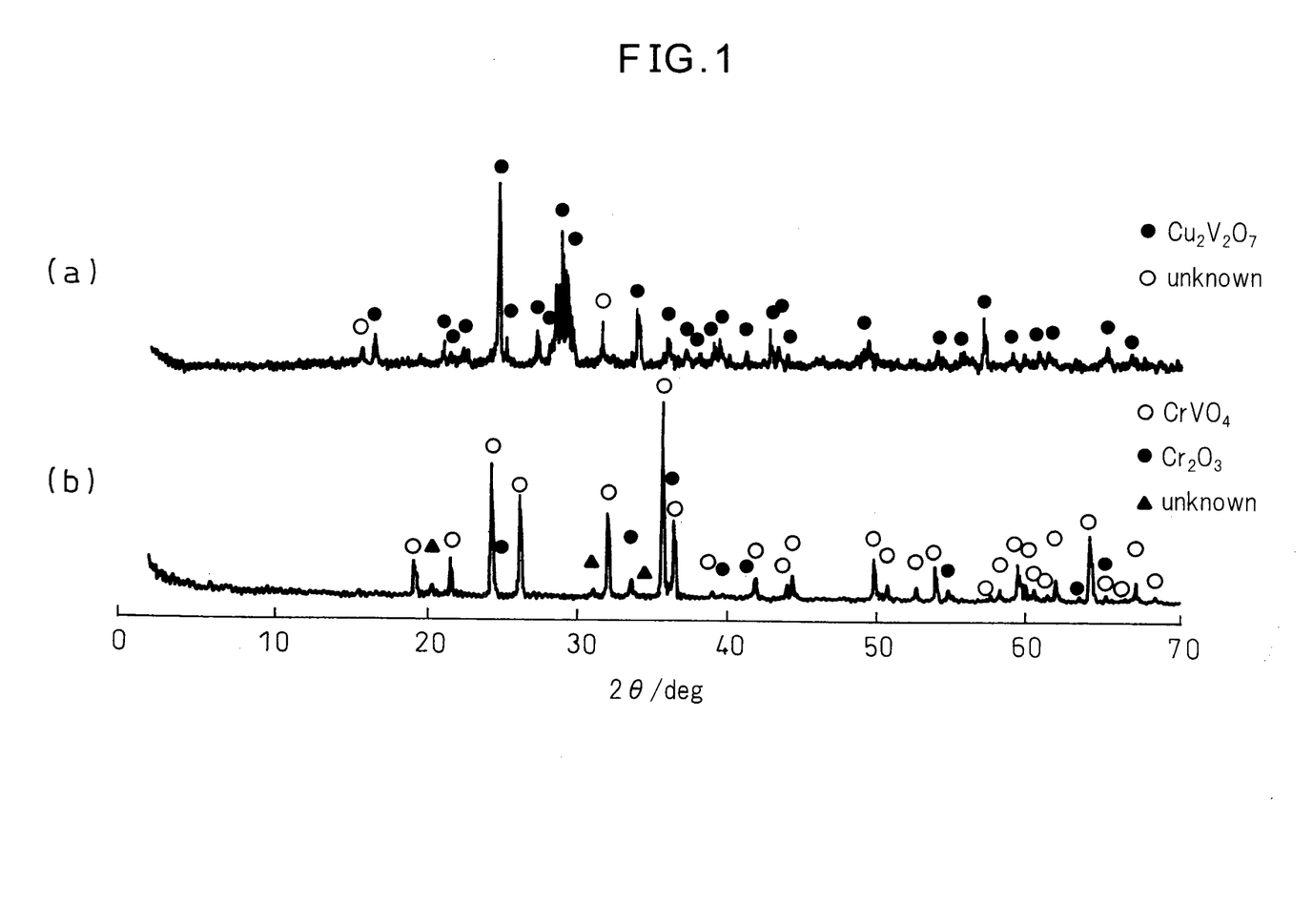
FIG. 1 is a view showing the results of X-ray diffraction analysis on the composite metal oxide used as an unsupported catalyst in (a) Reference Example 1 and (b) Reference Example 2.

Copper oxide and vanadium oxide in an atom ratio of respective metals of 1:1 were ground in a mortar and thoroughly mixed, and the mixture was charged into an alumina-made crucible and fired at 750° C. over 12 hours, whereby the unsupported catalyst used as the catalyst was obtained. FIG. 1(a) shows the results of X-ray diffraction analysis (XRD) on the obtained unsupported catalyst.

(Production of Supported Catalyst)

A supported catalyst where a composite metal oxide is supported on a porous silica support having a pore structure was produced as follows.

(Production of Supported Catalyst—Production of Porous Silica Support)

The porous silica support for the supported catalyst was produced by the method similar to the method described in JP-A-2008-12382. That is, the porous silica support was produced as follows.

In 6 L (liter) of distilled water, 1 kg of cetyltrimethylammonium chloride was dissolved. The obtained aqueous solution was stirred over 2 hours to self-align the cetyltrimethylammonium chloride. Thereafter, tetraethoxysilane and aqueous ammonia were added to the solution having self-aligned therein cetyltrimethylammonium chloride and the pH of the solution was adjusted to 9.5.

In this solution, tetraethoxysilane was hydrolyzed over 30 hours to precipitate silica around aligned hexadecylamine, whereby a secondary particle composed of a primary particle having nanosize pores was formed and thus, a porous silica support precursor was obtained.

Thereafter, the obtained porous silica support precursor was washed with aqueous ethanol, filtered, dried and fired in an air at 800° C. over 2 hours to obtain a porous silica support.

The porous silica support obtained here had pores of around 2.7 nm attributable to the pore structure of silica and pores of over 10 nm attributable to the gap between primary particles of silica.

(Production of Supported Catalyst—Loading of Composite Metal Oxide)

The composite oxide was loaded on the porous silica support by a water absorption loading method. Specifically, first, an aqueous solution obtained by dissolving copper nitrate in water was prepared, and the support was caused to absorb the aqueous solution, dried at 150° C. and calcined at 350° C. for 1 hour. Next, ammonium metavanadate was dissolved in water, and the support was caused to absorb the resulting aqueous solution, dried at 150° C. and calcined at 350° C. over 1 hour. Finally, the obtained support was fired at 600° C. over 2 hours to obtain a composite oxide-supported porous silica support.

The amount of copper supported was set to 0.12 mol/100 g-support, and the amount of vanadium supported was set to 0.12 mol/100 g-support.

Reference Example 2

In Reference Example 2, a composite metal oxide (Cr—V—O) of chromium (Cr) and vanadium (V) was used as the catalyst. An unsupported catalyst was produced in the same manner as in Reference Example 1, except that in the production of an unsupported catalyst, the firing temperature was changed to 700° C.

FIG. 1(b) shows the results of X-ray diffraction analysis (XRD) on the obtained unsupported catalyst.

Reference Example 3

In Reference Example 3, a composite metal oxide (Ce—V—O) of cerium (Ce) and vanadium (V) was used as the catalyst. An unsupported catalyst and a supported catalyst were produced in the same manner as in Reference Example 1, except that in the production of an unsupported catalyst, the firing temperature was changed to 700° C.

Figure 2:
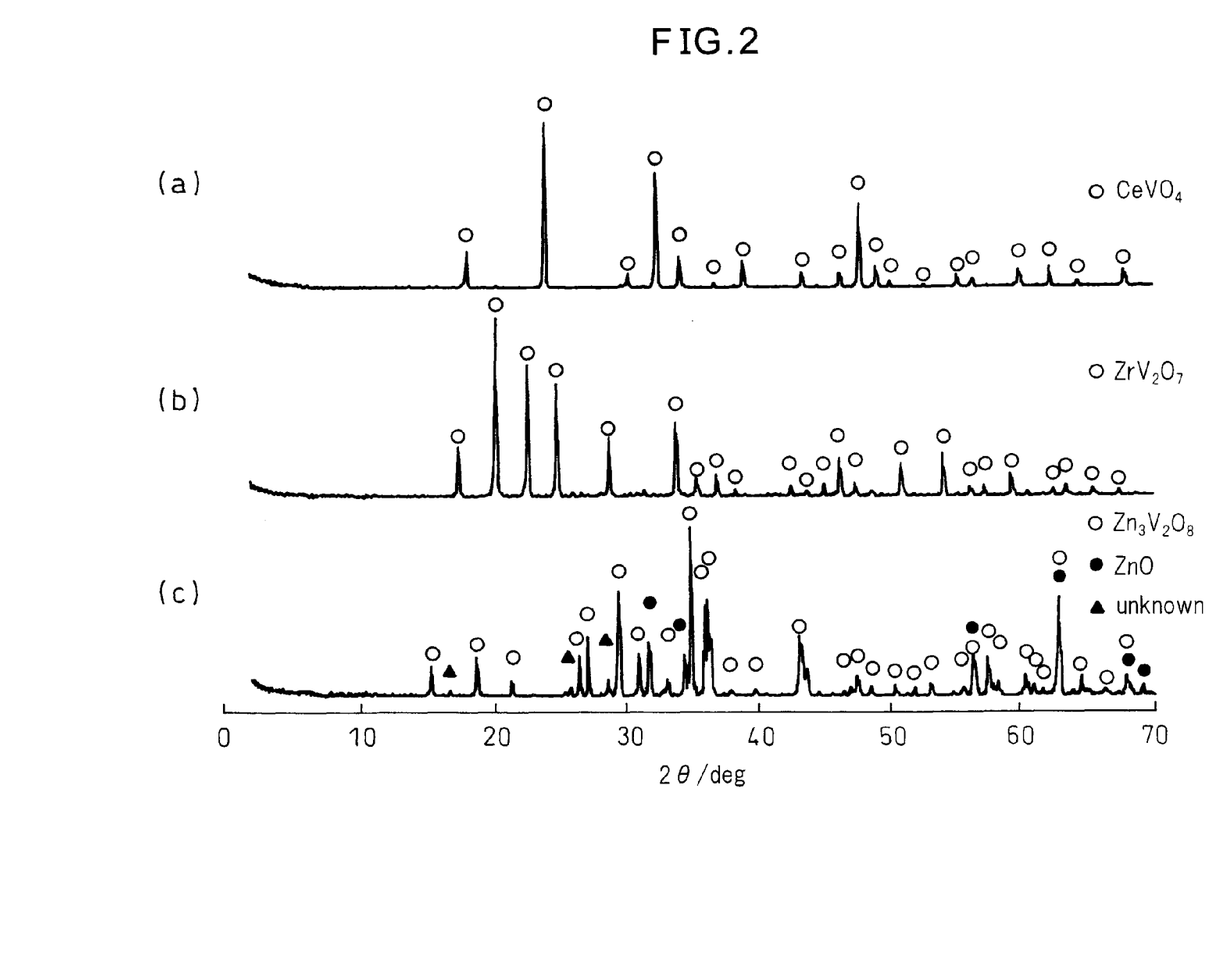
FIG. 2 is a view showing the results of X-ray diffraction analysis on the composite metal oxide used as an unsupported catalyst in (a) Reference Example 3, (b) Reference Example 4 and (c) Comparative Example 1.

FIG. 2(a) shows the results of X-ray diffraction analysis (XRD) on the obtained unsupported catalyst.

Reference Example 4

In Reference Example 4, a composite metal oxide (Zr—V—O) of zirconium (Zr) and vanadium (V) was used as the catalyst. An unsupported catalyst was produced in the same manner as in Reference Example 1, except that in the production of an unsupported catalyst, the firing temperature was changed to 700° C.

FIG. 2(b) shows the results of X-ray diffraction analysis (XRD) on the obtained unsupported catalyst.

Reference Example 5

In Reference Example 5, a composite metal oxide (Ti—V—O) of titanium (Ti) and vanadium (V) was used as the catalyst. An unsupported catalyst was produced in the same manner as in Reference Example 1, except that in the production of an unsupported catalyst, the firing temperature was changed to 600° C.

Reference Example 6

In Reference Example 6, a composite metal oxide (La—V—O) of lanthanum (La) and vanadium (V) was used as the catalyst. A supported catalyst was produced in the same manner as in Reference Example 1.

Reference Example 7

In Reference Example 7, a composite metal oxide (Nd—V—O) of neodymium (Nd) and vanadium (V) was used as the catalyst. A supported catalyst was produced in the same manner as in Reference Example 1.

Comparative Example 1

In Comparative Example 1, a composite metal oxide (Zn—V—O) of zinc (Zn) and vanadium (V) was used as the catalyst. An unsupported catalyst was produced in the same manner as in Reference Example 1, except that in the production of an unsupported catalyst, the firing temperature was changed to 700° C.

FIG. 2(c) shows the results of X-ray diffraction analysis (XRD) on the obtained unsupported catalyst.

Comparative Example 2

In Comparative Example 2, an oxide (Cr—O) of chromium (Cr) was used as the catalyst. An unsupported catalyst and a supported catalyst were produced in the same manner as in Reference Example 1, except that firing for forming a composite oxide was not performed in the production of an unsupported catalyst and the amount of chromium supported was set to 0.24 mol/100 g-support in the production of a supported catalyst.

Comparative Example 3

In Comparative Example 3, an oxide (Fe—O) of iron (Fe) was used as the catalyst. An unsupported catalyst and a supported catalyst were produced in the same manner as in Reference Example 1, except that firing for forming a composite oxide was not performed in the production of an unsupported catalyst and the amount of iron supported was set to 0.24 mol/100 g-support in the production of a supported catalyst.

Comparative Example 4

In Comparative Example 4, an oxide (Cu—O) of copper (Cu) was used as the catalyst. An unsupported catalyst was produced in the same manner as in Reference Example 1, except that firing for forming a composite oxide was not performed in the production of an unsupported catalyst.

Comparative Example 5

In Comparative Example 5, an oxide (V—O) of vanadium (V) was used as the catalyst. An unsupported catalyst was produced in the same manner as in Reference Example 1, except that firing for forming a composite oxide was not performed in the production of an unsupported catalyst.

Comparative Example 6

In Comparative Example 6, an oxide (Ni—O) of nickel (Ni) was used as the catalyst. An unsupported catalyst was produced in the same manner as in Reference Example 1, except that firing for forming a composite oxide was not performed in the production of an unsupported catalyst.

Comparative Example 7

In Comparative Example 7, an oxide (Co—O) of cobalt (Co) was used as the catalyst. An unsupported catalyst was produced in the same manner as in Reference Example 1, except that firing for forming a composite oxide was not performed in the production of an unsupported catalyst.

Comparative Example 8

In Comparative Example 8, a catalyst was not used.

Reference Example X

In Reference Example X, platinum was loaded on a γ-alumina support to produce a supported catalyst. The amount of Pt supported was set to 0.5 g/100 g-support.
(Evaluation)

Figure 3:
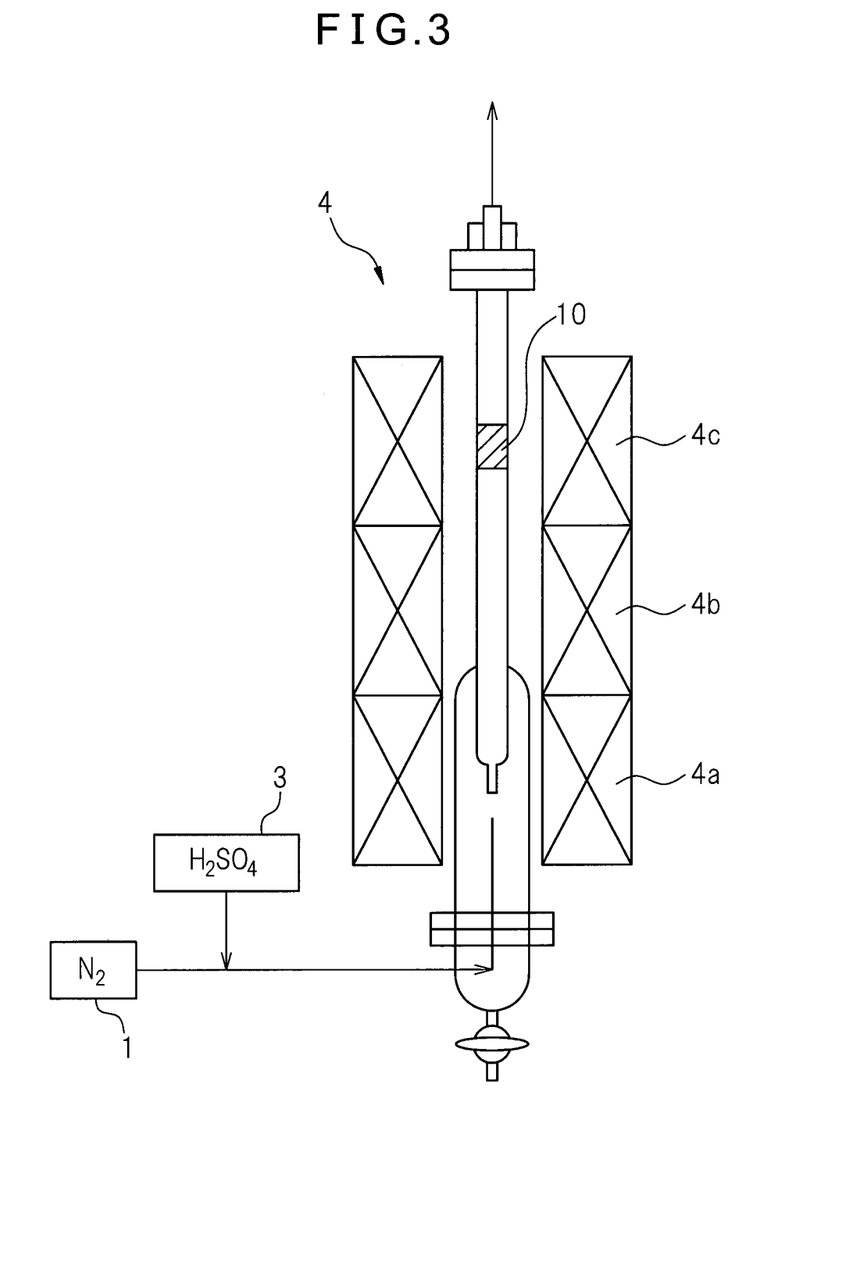
FIG. 3 is a view showing the apparatus used for evaluation of the sulfur trioxide decomposition catalyst of Example, Comparative Example and Reference Example.

Using the fixed bed flow reactor shown in FIG. 3, the unsupported catalysts and supported catalysts of Comparative Examples and Reference Example were evaluated for the conversion ratio of sulfur trioxide decomposition reaction of the following formula (X1-2):

$$SO_3 \rightarrow SO_2 + 1/2 O_2 \tag{X1-2}$$

Specifically, the conversion ratio of the sulfur trioxide decomposition reaction was evaluated as described below by referring to FIG. 3.

A quartz-made reaction tube 4 (inner diameter: 10 mm) was filled with, as a catalyst bed 10, 0.5 g of an unsupported catalyst or supported catalyst adjusted to 14 to 20 meshes, and nitrogen ($N_2$) (100 mL/min) and an aqueous 47 wt % sulfuric acid ($H_2SO_4$) solution (50 μL/min) were supplied to the lower stage of the quartz-made reaction tube 4 from a nitrogen supply part 1 and a sulfuric acid supply part 3, respectively.

The sulfuric acid ($H_2SO_4$) supplied to the lower stage of the quartz-made reaction tube 4 was heated in the lower and middle stages of the quartz-made reaction tube 4 to decompose into sulfur trioxide ($SO_3$) and oxygen ($O_2$) and flowed to the catalyst bed 10 ($SO_3$: 4.5 mol %, $H_2O$: 31 mol %, $N_2$: balance, gas flow rate in terms of 0° C.: 148.5 cm$^3$/min, weight-flow ratio (W/F ratio): 5.61×10$^{-5}$ g·h/cm$^3$, gas hourly space velocity (GHSV): about 15,000 h$^{-1}$).

In the quartz-made reaction tube 4, the lower stage was heated to about 400° C. by a heater 4a, and the middle stage was heated to about 600° C. by a heater 4b. Also, the upper stage of the quartz-made reaction tube 4 was initially heated to about 600° C. by a heater 4c and once a stationary state was established, heated to 650° C.

After the upper stage of the quartz-made reaction tube 4 was heated to 650° C. by the heater 4c, the outflow gas from the quartz-made reaction tube 4 was air-cooled and then bubbled through a 0.05 M iodine ($I_2$) solution, and sulfur dioxide ($SO_2$) was absorbed in the iodine solution. Iodometric titration of the iodine solution having absorbed therein sulfur dioxide was performed, using a 0.025 M sodium thiosulfate ($Na_2S_2O_3$) solution, whereby the amount of sulfur dioxide absorbed was determined.

Also, the outflow gas after bubbling through the iodine solution was cooled with a dry ice/ethanol mixture, and the remaining sulfur dioxide and sulfur trioxide were completely removed with a mist absorber and silica gel. Thereafter, the amount of oxygen ($O_2$) was determined using a magnetic pressure oxygen analyzer (MPA3000, manufactured by Horiba Ltd.) and a gas chromatograph (GC8A, manufactured by Shimadzu Corporation, molecular sieve 5A, TCD detector).

The conversion ratio from sulfur trioxide ($SO_3$) to sulfur dioxide ($SO_2$) was calculated from the amounts of sulfur dioxide and oxygen determined as above.

Evaluation results of Comparative Examples and Reference Example are shown in Table 1 below.

TABLE 1

| | | Conversion Ratio | |
|---|---|---|---|
| | Catalyst | Without Support (%) | With Support ($SiO_2$) (%) |
| Reference Example 1 | Cu—V—O | 51.7 | 93.6 |
| Reference Example 2 | Cr—V—O | 45.9 | — |
| Reference Example 3 | Ce—V—O | 26.9 | 67.9 |
| Reference Example 4 | Zr—V—O | 39.3 | — |
| Reference Example 5 | Ti—V—O | 67.2 | — |
| Reference Example 6 | La—V—O | — | 80.0 |
| Reference Example 7 | Nd—V—O | — | 93.6 |
| Comparative Example 1 | Zn—V—O | 9.8 | — |
| Comparative Example 2 | Cr—O | 40.5 | 53.3 |
| Comparative Example 3 | Fe—O | 25.9 | 32.4 |
| Comparative Example 4 | Cu—O | 6.2 | — |
| Comparative Example 5 | V—O | 22.3 | — |
| Comparative Example 6 | Ni—O | (no conversion) | — |
| Comparative Example 7 | Co—O | (no conversion) | — |
| Comparative Example 8 | none | (no conversion) | — |
| Reference Example X | Pt | — | 84.3 (γ-alumina support) |

It is understood from Table 1 that compared with the catalysts of Comparative Examples, the catalysts of Reference Examples 1-7 have significantly preferred sulfur trioxide decomposition characteristics at a relatively low temperature of 650° C. Also, it is understood from Table 1 that the catalysts of Reference Examples using no noble metal have sulfur trioxide decomposition characteristics equal to or higher than those of the catalyst of Reference Example X using platinum that is a noble metal.

Incidentally, vanadium oxide, particularly vanadium pentoxide ($V_2O_5$), used in Comparative Example 5 was employed for accelerating the reaction of formula (C-2) of oxidizing sulfur dioxide to obtain sulfur trioxide in the method referred to as a contact process of producing sulfuric acid through reactions represented by the following formulae (C-1) to (C-3):

$$S \text{ (solid)} + O_2 \text{ (gas)} \rightarrow SO_2 \text{ (gas)} \tag{C-1}$$

$$2SO_2 \text{ (gas)} + O_2 \text{ (gas)} \rightarrow 2SO_3 \text{ (gas)} \tag{C-2}$$

$$SO_3 \text{ (gas)} + H_2O \text{ (liquid)} \rightarrow H_2SO_4 \text{ (liquid)} \tag{C-3}$$

However, in Comparative Example 5 using vanadium oxide, the conversion ratio was significantly low compared with Reference Examples 1-7.

Reference Examples A1-A3, and Examples A1-A3

Reference Examples A1-A3, and Examples A1-A3 were performed as follows.

Reference Example A1 and Example A1

In Reference Example A1, a composite metal oxide of cerium (Ce) and vanadium (V) was used as the catalyst. Also, in Example A1, a composite metal oxide of tungsten (W), cerium (Ce) and vanadium (V) was used as the catalyst.
(Production of Supported Catalyst)
A supported catalyst where a composite metal oxide is supported on a porous silica support having a pore structure was produced as follows.
(Production of Supported Catalyst—Production of Porous Silica Support)
The porous silica support for the supported catalyst was produced by the method similar to the method described in JP-A-2008-12382. That is, the porous silica support was produced as follows.

In 600 mL (milliliter) of distilled water, 100.0 g of cetyltrimethylammonium chloride was dissolved. The obtained aqueous solution was stirred over 1 hour to such an extent as not generating a bubble to self-align the cetyltrimethylammonium chloride. Thereafter, 69.35 g of tetraethoxysilane (sometimes referred to as tetraethyl orthosilicate) was added to the solution having self-aligned therein cetyltrimethylammonium chloride, and the resulting solution was stirred for about 5 minutes until the system became uniform. Furthermore, 12.1 mL of 28% aqueous ammonia was added, and the resulting solution was stirred until the system became uniform. The pH of the obtained solution was 9.5.

This solution was left to stand for 1 day, and tetraethoxysilane in the solution was hydrolyzed to precipitate silica around aligned hexadecylamine, whereby a secondary particle composed of a primary particle having nanosize pores was formed and thus, a porous silica support precursor was obtained.

Figure 4:
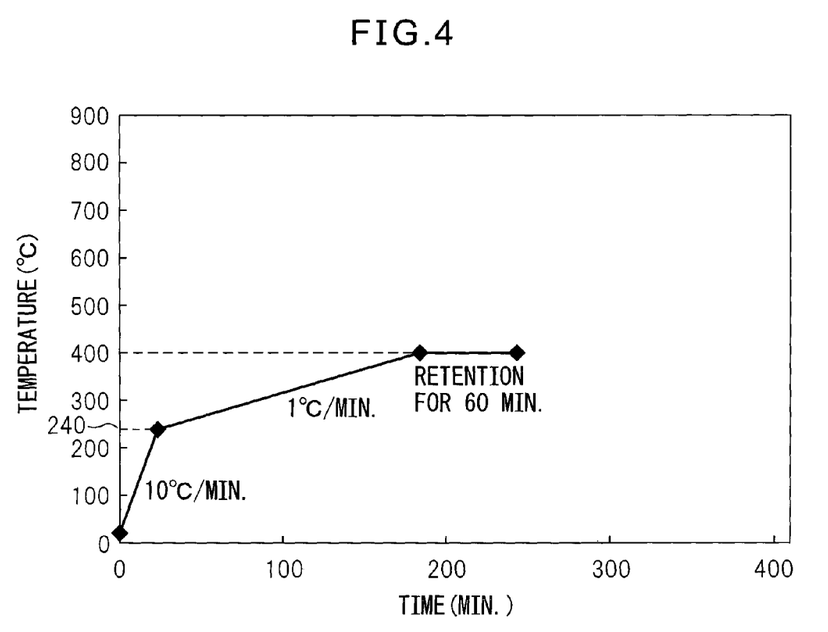
FIG. 4 is a schematic view showing the calcining condition for producing the sulfur trioxide decomposition catalyst of Reference Example A1.

Thereafter, the obtained porous silica support precursor was dried at 120° C. overnight, calcined according to the diagram shown in FIG. 4, then fired in an air at 600° C. over 2 hours and further fired in an air at 800° C. over 2 hours to obtain a porous silica support.
(Production of Supported Catalyst—Loading of Composite Metal Oxide)
The composite oxide was loaded on the porous silica support by a water absorption loading method. Specifically, first, an aqueous solution obtained by dissolving cerium nitrate in water was prepared, and the support was caused to absorb the aqueous solution, dried at 150° C. and calcined at 350° C. over 1 hour. Next, ammonium metavanadate was dissolved in water, and the support was caused to absorb the resulting aqueous solution, dried at 150° C. and fired at 800° C. over 1 hour to obtain the supported catalyst of Reference Example A1.

Also, the supported catalyst of Reference Example A1 was caused to absorb an aqueous solution of ammonium metatungstate, dried at 150° C. and fired at 800° C. over 1 hour to obtain the supported catalyst of Example A1.

The amount of vanadium supported was set to 0.12 mol/100 g-support, and the other components were supported according to the value shown in Table 2.

Reference Example A2 and Example A2

In Reference Example A2 and Example A2, respectively, a supported catalyst was produced in the same manner as in Reference Example A1 and Example A1, except that lanthanum was used instead of cerium and the composition ratio was changed as shown in Table 2.

Reference Example A3 and Example A3

In Reference Example A3 and Example A3, respectively, a supported catalyst was produced in the same manner as in Reference Example A1 and Example A1, except that neodymium was used instead of cerium and the composition ratio was changed as shown in Table 2.
(Evaluation)
The conversion ratio of sulfur trioxide decomposition reaction of the following formula (X1-2) was evaluated in the same manner as the evaluation in Reference Example 1 and the like.

$$SO_3 \rightarrow SO_2 + 1/2O_2 \tag{X1-2}$$

The evaluation results of Reference Examples and Examples are shown in Table 2 below.

TABLE 2

| | | Composition | Achievement Ratio (%) Based on Equilibrium Conversion | |
|---|---|---|---|---|
| | | | 650° C. | 700° C. |
| Ce V type | Reference Example A1 | Ce:V = 1:2 | 67.9 | 95.4 |
| | Example A1 | Ce:V:W = 1:2:0.2 | 74.7 | 97.3 |
| La V type | Reference Example A2 | La:V = 1:1.5 | 66.8 | 89.2 |
| | Example A2 | La:V:W = 1:1.5:0.15 | 52.5 | 98.6 |
| Nd V type | Reference Example A3 | Nd:V = 1:1.5 | 52.5 | 92.6 |
| | Example A3 | Nd:V:W = 1:1.5:0.15 | 58.8 | 99.1 |

It is understood from Table 2 that the catalysts of Reference Examples A1-A3 and Examples A1-A3 have significantly preferred sulfur trioxide decomposition characteristics at a relatively low temperature of 650° C. Also, it is understood from Table 2 that the catalysts of Examples A1-A3, when the catalysts are in a temperature of 700° C., show the achievement ratio close to 100% based on the equilibrium conversion.

DESCRIPTION OF NUMERICAL REFERENCES

1 Nitrogen supply part
2 Sulfuric acid supply part
4 Quartz-made reaction tube
4a, 4b, 4c Heater
10 Catalyst bed

The invention claimed is:
1. A sulfur dioxide production process comprising decomposing sulfur trioxide into sulfur dioxide and oxygen by using a sulfur trioxide decomposition catalyst including a compos- ite oxide of vanadium, tungsten and at least one metal selected from the group consisting of transition metal and rare earth elements.

2. The process as claimed in claim 1, wherein said at least one metal is selected from the group consisting of copper (Cu), chromium (Cr), titanium (Ti), zirconium (Zr), lanthanum (La), cerium (Ce), neodymium (Nd) and a combination thereof.

3. The process as claimed in claim 1, wherein in said composite oxide, the atom ratio between said at least one metal and vanadium is from 1:0.1 to 1:10.

4. The process as claimed in claim 1, wherein in said composite oxide, the atom ratio between said at least one metal and tungsten is from 1:0.01 to 1:1.

5. The process as claimed in claim 1, wherein said composite oxide is supported on a support.

6. The process as claimed in claim 5, wherein said support is selected from the group consisting of silica, alumina, zirconia, titania and a combination thereof.

7. The process as claimed in claim 6, wherein said support is a porous silica support having a pore structure.

8. The process as claimed in claim 7, wherein said composite oxide is supported inside the pore structure of said porous silica support, and in the pore distribution of said porous silica support, the peak attributable to a gap between primary particles of silica is present in the range of a pore size of 5 to 50 nm and the peak attributable to the pore structure inside the silica particle is present in the range of a pore size of 1 to 5 nm.

9. The process as claimed in claim 1, wherein said decomposition is performed at a temperature of 600° C. or more.

10. The process as claimed in claim 1, wherein said decomposition is performed at a temperature of 800° C. or less.

11. A hydrogen production process comprising splitting water into hydrogen and oxygen, wherein the process comprises decomposing sulfuric acid into water, sulfur dioxide and oxygen through a reaction represented by the following formula (X1) and out of the elementary reactions represented by the following formulae (X1-1) and (X1-2), which are elementary reactions of the reaction represented by the following formula (X1):

$$H_2SO_4 \rightarrow H_2O + SO_2 + 1/2 O_2 \qquad (X1)$$

$$H_2SO_4 \rightarrow H_2O + SO_3 \qquad (X1\text{-}1)$$

$$SO_3 \rightarrow SO_2 + 1/2 O_2, \qquad (X1\text{-}2)$$

wherein the elementary reaction of formula (X1-2) is performed by the process claimed in claim 1.

12. The hydrogen production process as claimed in claim 11, wherein the hydrogen production process is an S—I cycle process, a Westinghouse cycle process, or an Ispra-Mark 13 cycle process.

* * * * *